Patented Apr. 24, 1923.

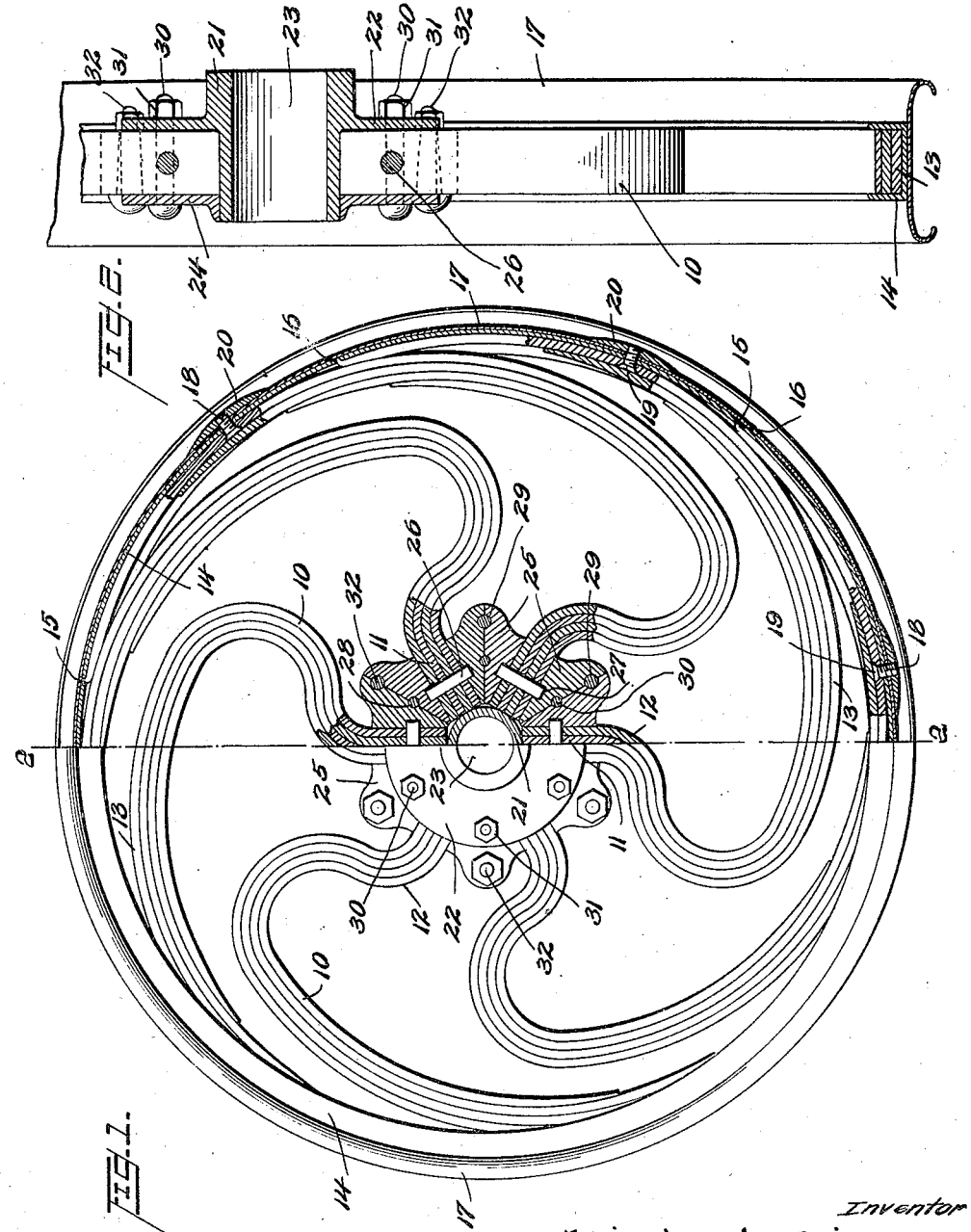

1,452,782

UNITED STATES PATENT OFFICE.

WILLIAM JAKOB BEISEL, OF PORT RICHMOND, NEW YORK.

SPRING WHEEL.

Application filed June 28, 1921. Serial No. 481,047.

*To all whom it may concern:*

Be it known that I, WILLIAM J. BEISEL, a citizen of the United States, and resident of Port Richmond, in the county of Richmond and State of New York, have invented certain new and useful Improvements in Spring Wheels, of which the following is a specification.

This invention relates to spring wheels for vehicles and its objects and the results produced by it include such strength and lasting qualities as fully satisfy the requirements in use, such simplicity of structure as makes manufacture easy and comparatively inexpensive, and such resiliency as avoids transmission to the axle of objectionable shocks and jars when passing over obstructions. The novel features will be more fully understood from the following description and claims taken with the accompanying drawings. In the drawings:

Figure 1 is a side view of a wheel embodying the invention, one half being shown in vertical section; and Figure 2 is a section on the line 2—2 of Figure 1.

As shown in the drawing, the wheel embodies a series of similar spring spokes 10, each composed of a series of metal layers or leaves in the form of a leaf spring, and each having a straight inner end portion 11 which enters the hub in a radial plane. Near the hub and at the point 12, each spoke is bent or curved laterally or to one side of the radial plane, and is then symmetrically curved or bent outwardly and back across the plane, the radius of curvature increasing before and after that plane is reached until the outer surface of the outer leaf 13 will at and near its ends be in the arc of a circle having the center of the hub as its center. The general form of the spoke so far described corresponds to that covered by my Patent 1,378,516, granted May 17, 1921.

Each inner leaf of each spoke is shorter than its adjacent outer leaf and has a tapering end portion closely fitting the inner face of the next outer leaf. The outer end of the outer leaf 13 extends materially beyond the end of the next adjacent leaf of the spoke and its inner surface fits and rests on the outer surface of the outer layer 13 of the adjacent spoke in the series, whereby the outer end surfaces of all of the outer leaves combined constitute a substantially continuous rim surface around the wheel. A channel rim 14 facing inwardly fits over the said rim surface with its sides walls extending inwardly close against the sides of outer leaf 13, and one or more inner leaves serving as lateral abutments or means preventing side displacement of the leaves. The rim surface fits the bottom wall of the channel in rim 14 and the tip ends 15 of the outer leaves 13 are turned outward on a radial plane forming in effect projections from or transverse ribs on the rim surface, and these transverse ribs or projections enter transverse slots 16 formed in the bottom wall of channel rim 14, thus so locking together the said end and rim as to prevent relative longitudinal or lateral movement.

A tire rim 17 which may be of any suitable form but which is shown as of the clincher type, is placed on rim 14 with its inner surface closely fitting the outer surface of rim 14, and the two rims are rigidly secured together by suitable means such as rivets if desired. However, this outer tire rim is rigidly secured to inner rim 14 and to each outer leaf 13 of the spokes by screws 18 having countersunk heads 19 in the inner face of leaf 13 and extending outwardly through that leaf, the base of channel rim 14 and the bottom of rim 17, and having screw threaded engagement with a comparatively thin metal retaining and strengthening member 20 closely fitting the bottom part in the rim 17 for a material distance circumferentially and tapering to its end edges.

The hub of the wheel includes the central cylindrical member 21 made of suitable metal, having an integral peripheral flange 22 and a central bore 23 for the axle. A second flange or disk 24 is also carried by member 21 but it is movable longitudinally of the cylindrical portion from one end towards the fixed flange having a central bearing opening slidably engaging said member. The inner end of each spoke abuts the central cylindrical member 21 and has a wedge block 25 on each side closely fitting it from its inner end to a point slightly beyond the margin of flanges 22 and 24. These wedge blocks are identical, and the pair fitting the straight end 11 of a spoke are held in place by a pin 26 passing through the spoke with its projecting ends entering sockets 27 in the blocks. When a spoke and its pair of wedge blocks are in place, the outer faces of the blocks are on radial planes through the center line of the hub midway between that spoke and the next adjacent spoke. Those outer surfaces extend towards the rim a greater distance than do the surfaces in contact with the spoke and materially beyond the margin of flanges 22 and 24, the outer ends of the blocks being formed on symmetrical meeting lines circumferentially. Each block has a pair of parallel grooves or depressions 28, 29, formed in its outer face parallel to the axis of the wheel, the inner groove 28 extending from flange 22 to flange 24 within their margins, and the outer groove 29 also extending all the way across the block outside of said margin. Since the blocks are duplicates, the grooves 28 and 29 in two adjacent blocks matching and fitting will form two openings or passageways through the blocks partly in each. Bolts 30 pass through openings formed by grooves 28 and through corresponding openings in flanges 22 and 24, and when the nuts 31 on them are tightened they will clamp the spokes, blocks, flange 24 and the cylindrical hub together in proper operative relation. The bolts by their engaging contact with the walls of the grooves 28 will furthermore so lock adjacent blocks and through them adjacent spokes as to prevent radial outward movement. Bolts 32 in the outer opening formed by grooves 29 beyond the outer margin of the flanges 22 and 24 also have this locking action. It will be noted that the structure described produces a hub which is very strong and durable, and in which the spokes are so engaged and held that they cannot be displaced under severe strains. The spokes also are strong from the hub outward, the most yielding part of each being near the rim, but that more yielding part taken with the longer leverage on the stronger parts makes the spokes as a whole yield sufficiently to avoid objectionable shocks and jars, and at the same time successfully stand strains tending to cause a break. It will of course be understood that any number of spokes desired may be used, and that the invention is not limited to the particular form or structural details shown, beyond what is called for in the claims.

Having thus described the invention, what is claimed as new and desired to be secured by Letters Patent is:

1. A vehicle wheel embodying a series of similar laminated leaf spring spokes curved transversely of radial planes through the axis of the wheel, the outer layers or leaves of adjacent spokes overlapping around the circumference forming a continuous circular rim surface, a rim fitting said rim surface, secured to the outer leaf of each spring, and an outer tire receiving rim secured to said first mentioned rim.

2. A vehicle wheel embodying a series of similar laminated leaf spring spokes curved transversely of radial planes through the axis of the wheel, the outer layers or leaves of adjacent spokes overlapping around the circumference forming a continuous circular rim surface, a rim fitting said rim surface throughout the circumference, secured to the outer leaf of each spring and having side parts extending a predetermined distance inwardly along the sides of leaves of each spoke.

3. A vehicle wheel embodying a series of similar laminated leaf spring spokes curved transversely of radial planes through the axis of the wheel, the outer layers or leaves of adjacent spokes overlapping around the circumference forming a continuous circular rim surface, a channel rim facing inward, in which said rim surface fits, means rigidly securing the outer leaves of the spokes to said rim at the bottom of the channel, and a tire rim fitting and rigidly secured to the outer surface of said channel rim.

4. A vehicle wheel embodying a series of similar laminated leaf spring spokes curved transversely of radial planes through the axis of the wheel, the outer layers or leaves of adjacent spokes overlapping around the circumference forming a continuous circular rim surface, a channel rim facing inward in which said rim surface fits, means rigidly securing the outer leaves of the spokes to said rim at the bottom of the channel, comprising outturned end portions of said outer leaves entering transverse slots in base wall of said channel rim and a countersunk headed screw extending outwardly through said rim at a material distance from the said outturned end and slot, and a tire rim fitting and rigidly secured to the outer surface of said channel rim.

5. A vehicle wheel embodying a series of similar laminated leaf spring spokes curved transversely of radial planes through the axis of the wheel, the outer layers or leaves of adjacent spokes overlapping around the circumference forming a continuous circular rim surface, the said outer leaves having short outwardly projecting end portions on radial planes, an inwardly facing channel rim having transverse slots in the bottom wall of the channel closely fitting said rim surface and the sides of adjacent spoke leaves with said outwardly projecting portions in said slots, a tire rim closely fitting the outer surface of said channel rim, a screw threaded member having a head portion countersunk in the inner face of the outer layer of each spoke passing outwardly through that layer through the base portion of the channel rim through the tire rim, and having screw threaded engagement with a metal member situated between the side margins of the tire rim closely fitting its surface for a material distance longitudinally around the periphery and tapering inwardly to said surface at its ends.

6. A vehicle wheel embodying a series of similar laminated leaf spring spokes curved transversely of radial planes through the axis of the wheel, the outer layers or leaves of adjacent spokes overlapping around the circumference forming a continuous circular rim surface, a continuous tire rim surrounding said rim surface, and means so operatively connecting said rim and spoke layers as to prevent relative longitudinal or lateral movement of the rim and outer layers of the spokes at the rim portion and to prevent lateral displacement of inner layers on the outer layer.

7. In a vehicle wheel, the combination with a hub, of a series of similar laminated leaf spring spokes entering said hub radially and secured thereto, each spoke being curved laterally of a radial plane through it and the axis of the hub at a point near the hub, then reversely and with substantial uniformity back to a point near said plane and then on a gradually increasing radius until the outer and longest leaf of each spoke will overlap the outer leaf of the next adjacent spoke, forming a continuous rim surface with the center of the hub as its center, a continuous tire rim surrounding said rim surface, and means for rigidly connecting said rim and the portions of the outer layers constituting the rim surface.

8. A vehicle wheel embodying a series of leaf spring spokes having inner ends in radial planes, and a hub having a cylindrical central portion from which the said ends of the spokes extend, a rigid peripheral flange on said central portion fitting one side of said spokes, a removable disk or flange-like part longitudinally adjustable on said central portion and adapted to fit and bear against the side of the spokes opposite to that against which the rigid flange bears, a pair of filler blocks between each pair of spokes fitting said spokes, and flanges from the central portion a material distance outward, and having surfaces in a radial plane midway between each pair of spokes fitting each other and removable bolts passing through said flanges and blocks detachably securing the parts together.

9. A vehicle wheel embodying a series of leaf spring spokes having inner ends in radial planes, and a hub having a cylindrical central portion from which the said ends of the spokes extend having a rigid flange on one side of said spokes and a longitudinally movable flange on the other side, a pin extending transversely through each spoke near its inner end and projecting therefrom on both sides, a pair of wedge blocks fitting the inner end of each spoke on opposite sides and having sockets entered by the projecting ends of said pins, the outer surfaces of said blocks being on radial planes through the axis of the hub midway between adjacent spokes, and screw threaded bolts and nuts connecting said flanges and through these adjustably clamping said spokes and wedge blocks in plane.

10. A vehicle wheel embodying a series of leaf spring spokes having inner ends in radial planes, and a hub having a cylindrical central portion from which the said ends of the spokes extend having a rigid flange on one side of said spokes and a longitudinally movable flange on the other side, a pin extending transversely through each spoke near its inner end and projecting therefrom on both sides, a pair of wedge blocks fitting the inner end of each spoke on opposite sides and having sockets entered by the projecting ends of said pins, the outer surfaces of said blocks being on radial planes through the axis of the hub midway between adjacent spokes whereby the outer face of any block on any spoke will closely fit the outer face of a block on the next adjacent spoke, the fitting surfaces of each pair of blocks being provided with corresponding and matching grooves or depressions parallel to the cylindrical portion of the hub, forming in effect holes or openings and clamping bolts passing through said openings and corresponding openings in said fixed and movable flanges thus holding the parts together tightly and securely and so locking said blocks and through them the spokes as to prevent radial outward movement.

11. A vehicle wheel embodying a series of leaf spring spokes having inner ends in radial planes, and a hub having a cylindrical central portion from which the said ends of the spokes extend having a rigid flange on one side of said spokes and a longitudinally movable flange on the other side, a pin extending transversely through each spoke near its inner end and projecting therefrom on both sides, a pair of wedge blocks fitting the inner end of each spoke on opposite sides and having sockets entered by the projecting ends of said pins, the surfaces in contact with the spoke extending out slightly beyond the margin of the flanges and the outer surfaces of said blocks being on radial planes midway between adjacent spokes and extending outwardly for a greater distance than the surfaces in contact with the spoke, the outer face of each block closely fitting the outer face of a corresponding block on the next adjacent spoke, and the fitting surfaces of each pair of blocks being provided with two grooves or depressions parallel to the cylindrical portion of the hub, those on one block corresponding to and matching those on the other block, one of the pairs of grooves being within the margins of the flanges and the other groove being beyond the outer margin of the flanges, the said grooves in the two blocks forming together in effect a longitudinal hole or opening extending from one flange to the other, and a longitudinal hole or opening beyond the flange, screw threaded bolts passing through the inner holes and corresponding holes in said flanges, screw threaded nuts on said bolts for adjustably clamping the interlocked parts together, and bolts passing through the holes beyond the margin of the flanges serving to lock together the pairs of blocks forming the holes.

In testimony whereof I hereunto affix my signature.

WILLIAM JAKOB BEISEL.